(12) United States Patent
Kiriyama

(10) Patent No.: US 8,695,768 B2
(45) Date of Patent: Apr. 15, 2014

(54) SHOCK ABSORBER

(75) Inventor: Kazuhiro Kiriyama, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1101 days.

(21) Appl. No.: 11/822,610

(22) Filed: Jul. 9, 2007

(65) Prior Publication Data

US 2008/0018030 A1 Jan. 24, 2008

(30) Foreign Application Priority Data

Jul. 19, 2006 (JP) .................................. 2006-197171

(51) Int. Cl.
*F16F 9/00* (2006.01)
*F16F 9/50* (2006.01)

(52) U.S. Cl.
USPC ................. 188/313; 188/322.13; 188/322.17; 188/322.2

(58) Field of Classification Search
USPC ................. 188/281, 284, 297, 313–316, 318, 188/322.13, 322.17, 322.2, 322.21, 322.14
See application file for complete search history.

(56) References Cited

U.S. PATENT DOCUMENTS

| | | | | |
|---|---|---|---|---|
| 2,452,885 A | * | 11/1948 | Willard | 188/315 |
| 3,272,495 A | * | 9/1966 | Axthammer | 267/64.16 |
| 4,054,277 A | * | 10/1977 | Sirven | 267/35 |
| 4,752,062 A | | 6/1988 | Domenichini | |
| 4,795,009 A | * | 1/1989 | Tanahashi et al. | 188/315 |
| 5,799,758 A | * | 9/1998 | Huang | 188/285 |
| 6,120,049 A | * | 9/2000 | Gonzalez et al. | 280/276 |

FOREIGN PATENT DOCUMENTS

| | | | |
|---|---|---|---|
| EP | 0 229 310 A | | 7/1987 |
| FR | 2 327 450 A | | 5/1977 |
| JP | 52-047180 A | | 4/1977 |
| JP | 59-013736 U | | 1/1984 |
| JP | 61193911 A | * | 8/1986 |
| JP | 63152738 A | * | 6/1988 |
| JP | 63-170112 A | | 7/1988 |
| JP | 63170112 A | * | 7/1988 |
| JP | 03-272338 A | | 12/1991 |
| JP | 5-180259 A | | 7/1993 |
| JP | 08-233017 A | | 9/1996 |
| WO | WO 98/58812 A | | 12/1998 |

* cited by examiner

*Primary Examiner* — Melody Burch
(74) *Attorney, Agent, or Firm* — Foley & Lardner LLP

(57) ABSTRACT

A shock absorber comprises a first cylinder including an inside bore; a piston dividing the inside bore of the first cylinder into a first chamber and a second chamber; a piston rod which extends within the first chamber; a second cylinder surrounding the first cylinder; a first connection passage arranged to connect the first chamber to a location outside of the shock absorber; a first tube member defining a second connection passage connected with the second chamber at the second end of the first cylinder; and a damping device comprising at least one valve element, the damping device being disposed between the second chamber and the second connection passage. The piston is configured to separate the first and second chambers so that the first and second chambers are not in fluid communication with each other through the piston.

18 Claims, 11 Drawing Sheets

COMPRESSION

COMPRESSION

SHOCK ABSORBER

BACKGROUND OF THE INVENTION

The present invention relates to a shock absorber or shock absorbing apparatus (or system) including one or more shock absorbers for a vehicle.

A Japanese patent document JP H05(1993)-180259 shows a shock absorber capable of adjusting a damping force. This shock absorber is provided with a damping valve used in common for extension and compression. This shock absorber includes an extension side check valve on an upper chamber's side of a piston; a compression side check valve provided in a base valve; a communicating chamber between an inner shell and a cylinder formed with communication hole communicating with a lower chamber; and a reservoir chamber formed between the inner shell and an outer shell. The damping valve includes a valve element disposed between a primary pressure chamber communicating with the communicating chamber and a secondary pressure chamber, a pair of relief valves on the upper and lower sides of the valve element, and a poppet valve to vary a seat force.

SUMMARY OF THE INVENTION

However, this shock absorber has only one connection passage (communicating hole) leading to the outside of the cylinder. Accordingly, this shock absorber is suitable for producing a force in the direction to extend the piston rod, but unsuitable for producing a force on the compression side because, in spite of the need for decreasing the internal pressure, it becomes difficult to decrease the pressure and to produce a force due to a negative pressure increasing the tendency of bubble formation by gas dissolved in the operating oil and the tendency of vaporization of the operating oil.

It is therefore an object of the present invention to provide a shock absorber or a shock absorbing apparatus suitable for reducing the flow resistance in a connection passage connecting a chamber in the shock absorber to the outside, and for efficiently producing a force in a direction to extend a piston rod, and a force in a direction to withdraw the piston rod.

According to one aspect of the invention, a shock absorber comprises: a first (inner) cylinder extending from a first end to a second end in a first direction, and including an inside bore; a piston dividing the inside bore of the first cylinder into a first chamber between the piston and the first end and a second chamber between the piston and the second end of the first cylinder; a piston rod which is connected with the piston and which extends in the first chamber; a second (outer) cylinder surrounding the first cylinder, and forming a first connection passage arranged to connect the first chamber to an outside, and formed at least by a space between the first cylinder and the second cylinder; a tube member extending, from the second end of the first cylinder, in a direction away from the second chamber, and defining a second connection passage connected with the second chamber at the second end of the first cylinder; and a damping device to provide a damping force to an operating fluid flowing between the second chamber and the second connection passage defined by the tube member, the damping device being disposed between the second connection passage and the second chamber so that the second connection passage is connected through the damping device with the second chamber.

According to another aspect of the present invention, a shock absorbing apparatus comprises at least one shock absorber which comprises: a piston which is slidably received in a cylinder bore and which divides the cylinder bore into a first chamber on a first side and a second chamber on a second side; a piston rod extending, in the first chamber, from a second end connected with the piston to a first end in a second axial direction; a first cylinder extending from a first end to a second end in a first axial direction opposite to the second axial direction, and including therein the cylinder bore divided into the first chamber between the piston and the first end of the first cylinder and the second chamber between the piston and the second end of the first cylinder; a second cylinder surrounding the first cylinder, and defining a first connection passage which is formed by a space between the first cylinder and the second cylinder and which extends from a first end connected with the first chamber, to a second end leading to a first port opening to an outside; a tube member extending in the first axial direction from the second end of the first cylinder, and defining a second connection passage extending from a first end connected with the second chamber, to a second end leading to a second port opening to the outside; and a damping device disposed between the second chamber of the first cylinder and the second connection passage of the tube member, and arranged to control a flow of an operating fluid between the second chamber and the second connection passage.

According to still another aspect of the present invention, a shock absorber comprises a piston subassembly and a cylinder subassembly. The piston subassembly includes a piston which is slidably received in a cylinder bore and which divides the cylinder bore into a first chamber on a first side and a second chamber on a second side, and a piston rod extending from the piston in the first chamber. The cylinder subassembly includes first casing means, second casing means and damping means. The first casing means is for defining the cylinder bore extending from a first end on the first side to a second end on the second and including the first chamber between the piston and the first end of the cylinder bore and the second chamber between the piston and the second end of the cylinder bore, and a first connection passage extending from a first end connected with the first chamber, to a second end leading to an outside. The second casing means is for defining a second connection passage which is located on the second side of the second end of the cylinder bore and which extends from a first end connected with the second chamber to a second end leading to the outside. The damping means is disposed between the second chamber and the second connection passage, for restraining a flow of an operating fluid between the second chamber and the second connection passage.

DETAILED DESCRIPTION OF THE INVENTION

Figure 1:
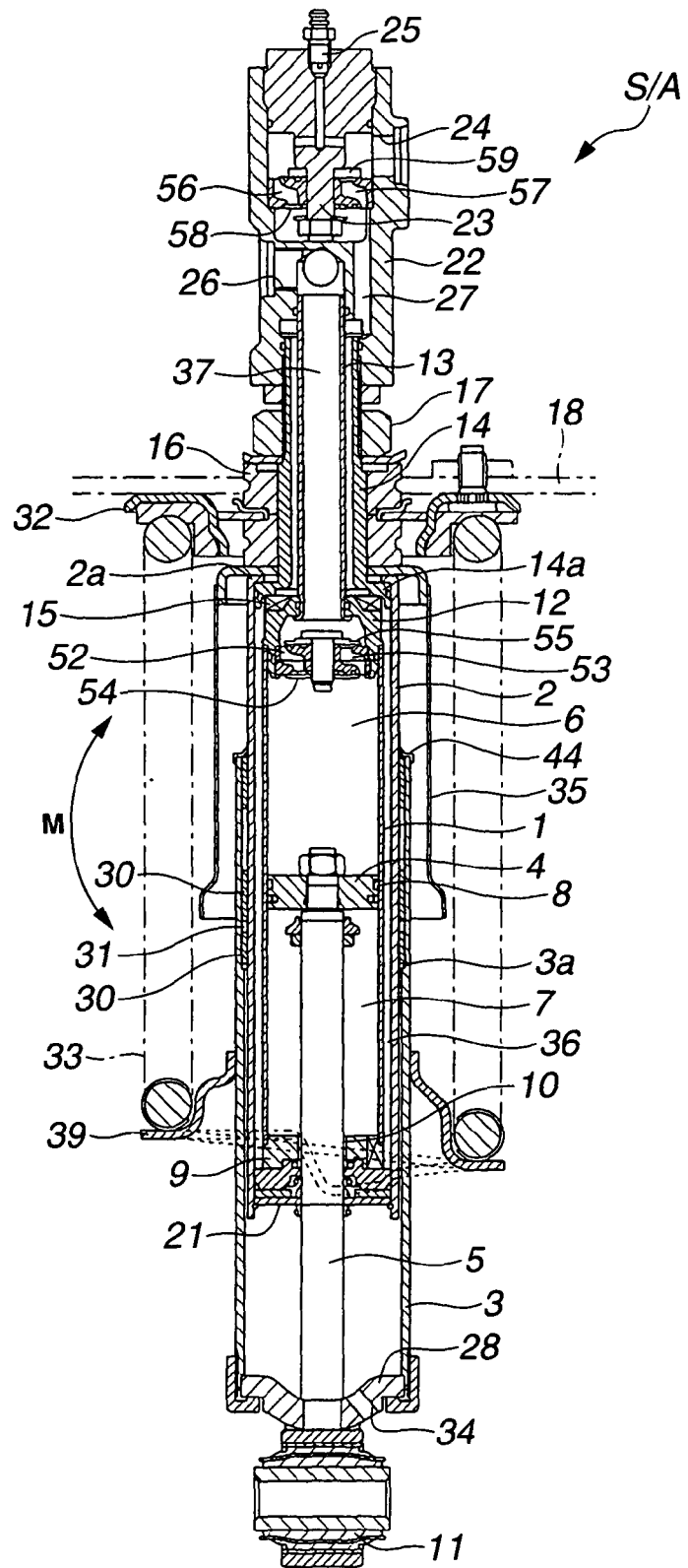
FIG. 1 is a sectional view of a shock absorber according to a first embodiment of the present invention.

FIG. 1 shows, in section, a shock absorber S/A according to a first embodiment of the present invention. This shock absorber S/A has a coaxial triple nesting structure of a first (inner) cylinder 1, a second (outer) cylinder 2 surrounding first cylinder 1 coaxially, and a third cylinder 3 surrounding second cylinder 2 coaxially. First, second and third cylinders 1, 2 and 3 are hollow cylinders disposed coaxially on a common center axis, and each cylinder extends from a first (lower) end on a first side that is the lower side as viewed in FIG. 1, to a second (upper) end on a second side that is the upper side as viewed in FIG. 1 in a first direction. In this example, the first direction is a first axial (or upward) direction extending along the common center axis upwards from the lower side to the upper side as viewed in FIG. 1, and a second direction is a second axial (or downward) direction extending along the common center axis downwards as viewed in FIG. 1.

A piston 4 is received slidably in first cylinder 1, and arranged to divide the inside cylinder bore of first cylinder 1 into first and second chambers. In this example, the first chamber is a lower chamber 7 formed axially between piston 4 and the lower (first) end of first cylinder 1, and the second chamber is an upper chamber 6 formed axially between piston 4 and the upper (second) end of first cylinder 1. Piston 4 is provided with a first sliding bush 8 for reducing a sliding friction of piston 4.

A piston rod 5 extends from an upper (second) end connected with piston 4, to a lower (first) end in the downward (second) direction. Piston rod 5 extends through a first bottom plug (cover) member 9 closing the lower (first) end of first cylinder 1, and projects from first cylinder 1 in the downward (second) direction. First bottom plug member 9 is formed with a center through hole through which piston rod 5 extends slidably, and one or more connecting through holes for connecting the lower (first) chamber 7 to the outside. In the center hole of first bottom plug member 9, there is provided a second sliding bush 10 in sliding contact with piston rod 4. The lower (first) end of piston rod 4 is adapted to be connected with a suspension or an axle of a vehicle, and thereby to support a wheel of the vehicle. In this example, a bush member 11 is fixed to the lower (first) end of piston rod 5, and so arranged that the lower (first) end of piston rod 5 is connected through bush member 11 with the suspension or axle.

An upper (second) chamber side damping device or second (or second side) damping device 12 is fixed to the upper (second) end of first cylinder 1. Second damping device 12 of this example is a damping valve. Second damping device 12 is plugged in the upper (second) end of first cylinder 1 so as to serve as an end member, a plug member, or a cover member closing the upper (second) open end of first cylinder 1. Second damping valve 12 includes a lower (first) port leading to upper (second) chamber 6 of first cylinder 1, and an upper (second) port.

A first tube (or tubular) member 13 is connected to the second (upper) end of first cylinder 1 through the second damping device 12. The upper (second) port of second damping valve 12 leads to the inside bore of the first tube member 13. First tube member 13 is coaxial with first cylinder 1. First tube member 13 extends in the upward (first) direction from second damping valve 12 fixedly fit in the upper (second) end of first cylinder 1. First tube member 13 defines a second connection passage 37.

A second tube (or tubular) member 14 is disposed coaxially around first tube member 13. Second tube member 14 includes an outward flange 14a formed at a lower (first) end of second tube member 14. The lower (first) end of second tube member 14 abuts on the upper (second) side of second damping valve 12, through a spacer member (15). The spacer member (15) includes a plurality of spacers 15 arranged circumferentially around the common center axis at intervals so that an annular space formed between the first and second tube members 13 and 14 communicates with an annular space formed between the first and second cylinders 1 and 2. The spacer member including spacers 15 can serve as a second (or second side) end member defining a passage connecting the upper (second) end of the space (36) between first and second cylinders 1 and 2, with the lower (first) end of the space between the first and second tube members 13 and 14.

Second tube member 14 includes a lower (first) half portion and an upper (second) half portion. An external male thread is formed only in the outside circumferential surface of the upper half portion. The position of the upper (second) end of second tube member 14 is lower than the position of the upper (second) end of first tube member 13. That is, the upper (second) end of first tube member 13 projects in the upward (first) direction from the upper (second) end of second tube member 14. In this example, the lower (first) end of first tube member 13 also projects in the downward (second) direction from the lower (first) end of second tube member 14. First tube member 13 is longer than second tube member 14.

A narrowed portion 2a is formed at the upper (second) end of second cylinder 2. The narrowed portion 2a includes an annular portion projecting radially inwards like an inward flange. Second tube member 14 includes an outward flange 14a formed at the lower (first) end of second tube member 14. This outward flange 14a is fit in second cylinder 2 so that the second tube member 14 is positioned radially by second cylinder 2 (with abutment between the outside circumferential edge of outward flange 14a and the inside circumferential surface of second cylinder 2). The narrowed portion 2a of second cylinder 2 abuts, from the upper (second) side, against the upper (second) side of outward flange 14a of second tube member 14. With this abutment, the upper (second) end of second cylinder 2 is supported by the upper (second) end of first cylinder 1 through outward flange 14a, spacer member (15) and second damping valve 12.

A hollow cylindrical bush member 16 is disposed around the second tube member 2. Bush member 16 is disposed on the outward flange 14a of second tube member 14 through the narrowed portion 2a of second cylinder 2. A nut 17 is screwed on the externally threaded upper (second) half portion of second tube member 14, and arranged thereby to press the bush member 16 from the upper side in the downward (second) direction. With this nut 17, therefore, the narrowed portion or inward flange 2a of second cylinder 2 is fixed to the upper (second) end of first cylinder 1 through the spacer member (15) and the second damping valve 12. A reference numeral 18 indicates a vehicle body (or a vehicle body member).

Figure 2:
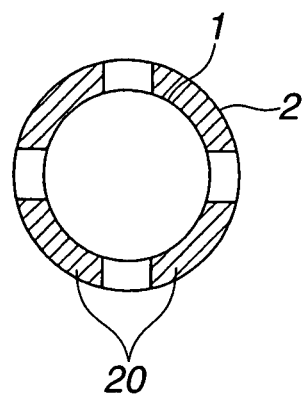
FIG. 2 is a schematic view showing a spacer member disposed between a first cylinder and a second cylinder in the shock absorber of FIG. 1.

Between the outside circumferential surface of first cylinder 1 and the inside circumferential surface of second cylinder 2, there is disposed a spacer member composed of a plurality of spacers 20 arranged circumferentially at regular intervals, as shown in FIG. 2. Spacers 20 are not shown in the section of FIG. 1. Spacers 20 are spaced circumferentially so as to form through gaps which form a connecting passage between the outside circumferential surface of first (inner) cylinder 1 and the inside circumferential surface of second (outer) cylinder 2. This connecting passage serves as at least a part of a first connection passage 36 defined between first and second cylinders 1 and 2, for connecting the lower (first) chamber 7 to the outside. In the example of FIG. 2, there are four of the gaps. The spacers 20 need not be long to cover the axial length over which the outside circumferential surface of first cylinder 1 and the inside circumferential surface of second cylinder 2 confront each other. The first (lower chamber side) connection passage 36 is formed by the annular space between the outside circumferential surface of first cylinder 1 and the inside circumferential surface of second cylinder 2, and the annular space between the first and second tube members 13 and 14.

The lower (first) end of second cylinder 2 is closed by a second bottom plug member 21 disposed under the first bottom plug member 9 of first cylinder 1 so that the upper (second) side of second bottom plug member 21 abuts on the lower (first) side of first bottom plug member 9. The lower (first) end of first connection passage 36 formed by the annular space between first and second cylinders 1 and 2 is connected with the lower (first) chamber 7 through at least one connecting through hole formed in first bottom plug member 9.

The first and second bottom plug members 9 and 21 can serve as a first end member closing the lower (first) ends of first and second cylinders 1 and 2 and including a passage connecting the lower end of lower (first) chamber 7 with the lower (first) end of the first connection passage 36 formed between first and second cylinders 1 and 2. In this example, first cylinder 1 is shorter than second cylinder 2. The lower and upper ends of first cylinder 1 are both located inside second cylinder 2, without projecting out of second cylinder 2.

A plug member (or port member) 22 is screwed on the upper (second) half portion of second tube member 14. Plug member 22 extends coaxially with second tube member 14, in the upward (first) direction from second tube member 14. Plug member 22 includes an upper (second side) portion formed with a hollow portion in which a lower (first) chamber side damping device or first (side) damping device 23 in the form of a damping valve is screwed. The first damping valve 23 includes a first port (on the outer side) leading to the outside through a side hole 24 formed in plug member 22, and a second port connected to an upper (second side) open end of the annular space between first and second tube members 13 and 14 of the first connection passage. The side hole 24 can serve as a first connecting portion or first connection port of the shock absorber S/A, to connect the lower (first) chamber 7 to the outside.

A device 25 is a valve for air bleeding. Furthermore, plug member 22 further includes a lower (first side) portion formed with a first passage 26 which includes a central portion communicating with the upper open end of first tube member 13, and which opens sideways in the circumferential wall of plug member 22. Through this first passage 26, the inside bore of first tube member 13 is connected to the outside. First passage 26 can serve as a connecting portion or connecting port of the shock absorber S/A, to connect the upper (second) chamber 6 to the outside.

Plug member 22 is further formed with a second passage 27 which communicates with the annular space between the outside circumferential surface of first tube member 13 and the inside circumferential surface of second tube member 14, and which extends upwards to the upper end connected to the second port of first side damping device 23. This second passage 27 leads to the second port of lower chamber side damping valve 23 fixed in the upper portion of plug member 22.

A third bottom plug member 28 is fixed by screwing to the lower end of third cylinder 3. Third bottom plug member 28 is fixed coaxially with the lower (first) end of piston rod 5.

Third cylinder 3 includes an upper (second side) portion, a lower (first side) portion and a step portion 3a separating the upper portion and the lower portion from each other. The upper portion of third cylinder 3 is a portion which confronts the second cylinder 2 radially even when piston 4 is located at a bottom dead center (lowest position). The inside diameter of the upper portion of third cylinder 3 is slightly greater then the inside diameter of the lower portion of third cylinder 3. On the upper side of step portion 3a, a third sliding bush 30 shaped like a hollow cylinder is disposed between third cylinder 3 and second cylinder 2, and arranged to enable smooth sliding movement of third cylinder 3 relative to second cylinder 2 in the axial direction.

Third sliding bush 30 is formed with at least one opening 31 which contains grease. The opening 31 may be in the form of a slit. This opening 31 can serve as a lubricant collecting portion, and the grease can serve as a lubricant. Instead of the opening 31, the lubricant collecting portion may be a recessed portion recessed in the surface of third sliding bush 30.

A seal member 44 is provided at the upper end of third cylinder 3, and arranged to seal the annular space between the outside circumferential surface of second cylinder 2 and the inside circumferential surface of third cylinder 3. Third bottom plug member 28 is formed with a through hole 34 opening to the outside. This through hole 34 can serve as a connection hole.

A coil spring 33 serving as a suspension spring is disposed coaxially around third cylinder 3, between a lower (first) annular spring seat portion or member 39 fixed to the outside circumference of third cylinder 3 and arranged to support the lower (first) end of coil spring 33, and an upper (second) annular spring seat portion or member 32 fixed to the bush member 16 and arranged to support the upper (second) end of coil spring 33. The upper spring seat portion 32 is fixed to the member 18 of the vehicle body. The member 32 and/or bush member 16 can serve as a fixing portion adapted to be fixed to the vehicle body. A tubular cover member 35 is disposed radially between third cylinder 3 and coil spring 33, and arranged to prevent coil spring 33 from contacting with third cylinder 3.

Each of second (upper chamber side) damping valve 12 and first (lower chamber side) damping valve 23 is set to have such a damping characteristic that a damping force to the inflow of an operating fluid into the corresponding one of the upper and lower chambers 6 and 7 in first cylinder 1 is null or small, and a damping force of a predetermined magnitude required by the shock absorber S/A is generated to the outflow of the operating fluid out of the corresponding one of upper and lower chambers 6 and 7.

Upper chamber side damping valve 12 of this example includes two damping passages 52 and 53 connecting upper chamber 6 and the inside bore of first tube member 13; a first valve element 54 disposed in damping passage 52, and a second valve element 55 disposed in the other damping passage 53. The first valve element 54 is shaped like a plate, and arranged to close by the fluid pressure from upper chamber 4, and to open by the fluid flowing into upper chamber 6. The second valve element 55 is shaped like a plate, and arranged to open by the fluid flowing out of upper chamber 6, and to close by the fluid pressure from the inside bore of first tube member 13 to upper chamber 6. The first valve element 54 is set to have a weaker spring force and to open without making strong resistance against the fluid flow from the inside bore of first tube member 13 into upper chamber 6. On the other hand, the second valve element 55 is set to have a stronger spring force, and thereby to generate a greater damping force by decreasing the opening for the fluid flow from upper chamber 6 into the inside bore of first tube member 13.

Similarly, lower chamber side damping valve 23 includes two damping passages 56 and 57 connecting the lower chamber side connection passage 36 and the outside; a first valve element 58 disposed in first damping passage 56, and a second valve element 59 disposed in second damping passage 57. The first valve element 58 is shaped like a plate, and arranged to close by the fluid pressure from the lower chamber side connection passage 36, and to open by the fluid flowing from the outside toward lower chamber 7. The second valve element 59 is shaped like a plate, and arranged to open by the fluid pressure from the lower chamber side connection passage 36, and to close by the fluid from the outside toward lower chamber 7. The first valve element 58 is set to have a weaker spring force and to open without making strong resistance against the fluid flow from the outside into the lower chamber side connection passage 36. On the other hand, the second valve element 59 is set to have a stronger spring force, and thereby to generate a greater damping force required as the shock absorber S/A by decreasing the opening for the fluid flow from the lower chamber side connection passage 36 to the outside.

The thus-constructed shock absorber S/A is to be provided for the suspension of a wheel of a vehicle. In the assembled state of the shock absorber S/A, the lower (first) end of piston rod 5 projecting downwards from first cylinder 1 is attached to a suspension link in the form of a lower arm, through the bush; and the upper portion of first cylinder 1 is attached to the vehicle body (member) 18 through the upper spring seat portion 32. Therefore, each shock absorber extends and shortens in accordance with up and down movement of the corresponding wheel, and rolling movement of the vehicle, and thereby reduce vibrations rapidly by generating an intended damping force.

Figure 5:
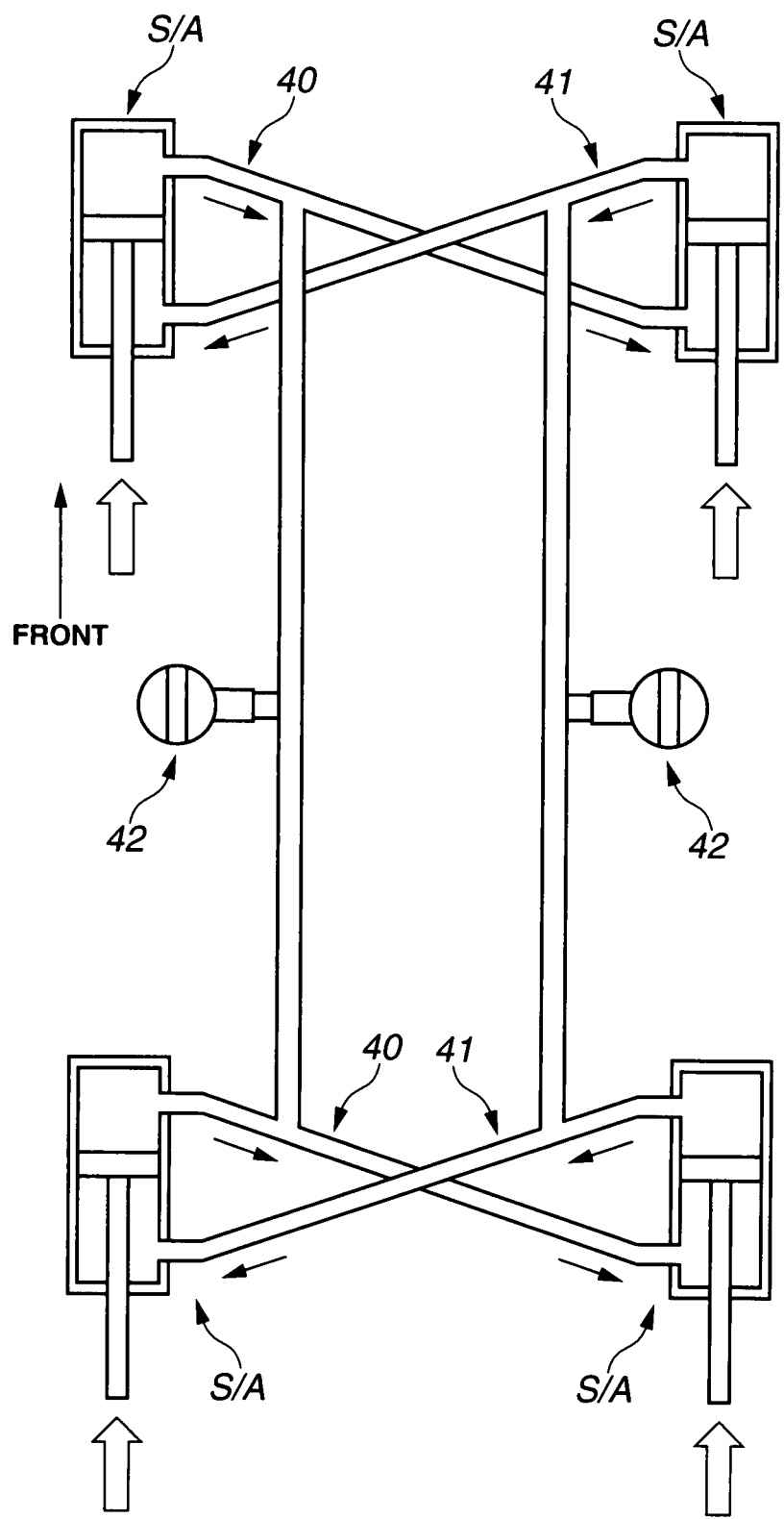
FIG. 5 is a schematic view showing an arrangement of four shock absorbers in the state of a bounce.

FIG. 5 shows a shock absorbing apparatus including at least one shock absorber S/A constructed as mentioned above. In the example shown in FIG. 5, the shock absorbing apparatus or system includes four of the shock absorbers, respectively, for the four wheels of a vehicle. The chambers of the four shock absorbers S/A in the vehicle are connected as shown in FIG. 5. In each of the left and right pairs on the front and rear sides, the upper and lower chambers are connected by crosswise piping of a first lateral pipe 40 connecting the upper (second) chamber of the left side shock absorber with the lower (first) chamber of the right side shock absorber; and a second lateral pipe 41 connecting the upper (second) chamber of the right side shock absorber with the lower (first) chamber of the left side shock absorber. Moreover, the first lateral pipe 40 on the front side is connected with the first lateral pipe 40 on the rear side by a first longitudinal pipe. Similarly, the second lateral pipe 41 on the front side is connected with the second lateral pipe 41 on the rear side by a second longitudinal pipe. An accumulator 42 is connected with each of the first and second longitudinal pipes.

The thus-constructed shock absorber S/A is operated on an extension stroke and a compression stroke in the following manner.

Figure 3:
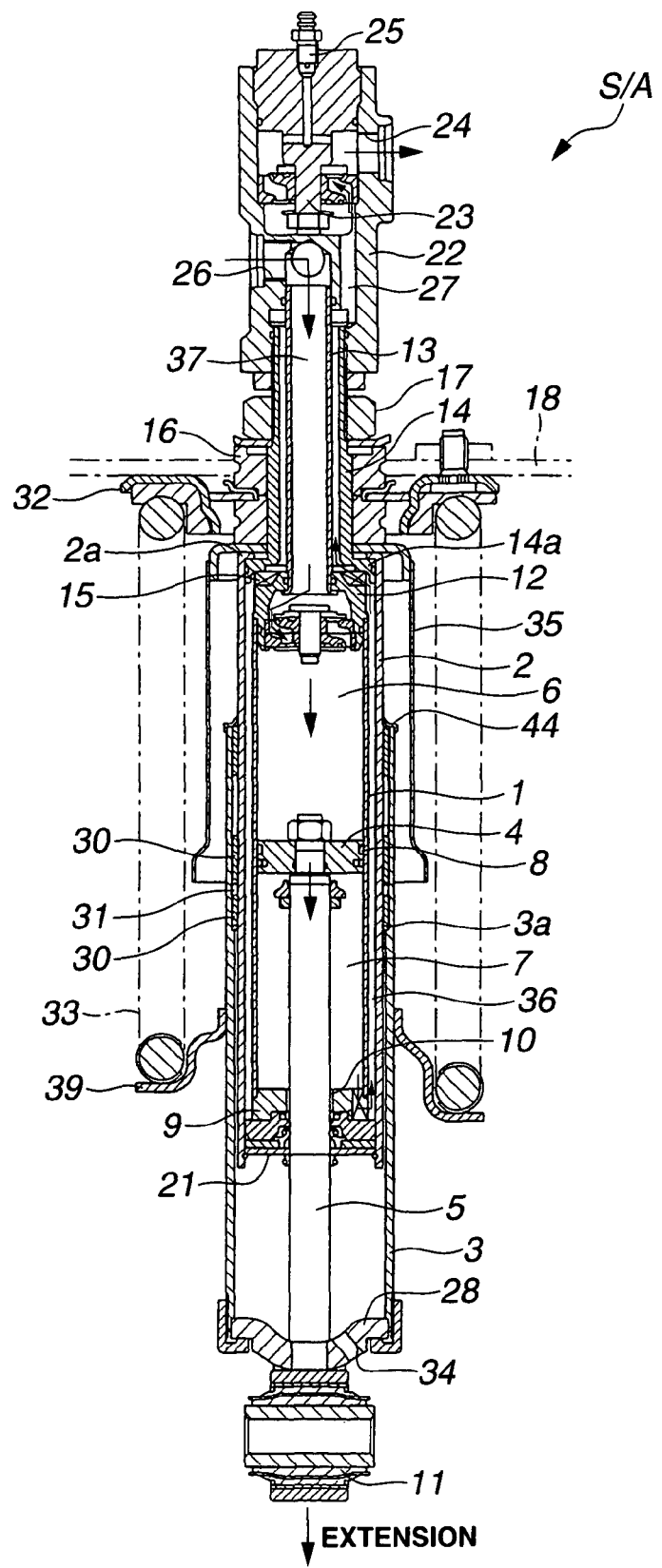
FIG. 3 is a sectional view for illustrating an extension stroke of the shock absorber of FIG. 1.

On the extension stroke, the piston 4 is pushed downwards, as shown in FIG. 3, and the pressure is increased in lower chamber 7 and lower chamber side connection passage 36. Therefore, by the difference between the pressure in the lower chamber 7 and lower chamber side connection passage 36, and the pressure of the outside, part of the operating fluid in lower chamber 7 and lower chamber side connection passage 36 flows, through lower chamber side damping valve 23, to the outside, and a damping force is generated during this flow. In this case, the operating fluid is drawn toward upper chamber 6 through upper chamber side damping valve 12 by the downward movement of piston 4. However, the upper chamber side damping valve 12 is constructed to generate little or no damping force to the inflow into upper chamber 6. As a result, there is produced little or no pressure difference between the upper chamber side connection passage 37 and upper chamber 6.

In a comparative example in which the upper chamber side damping valve 12 is arranged to produce a damping force greater than or equal to a predetermined magnitude level when the operating fluid is drawn into upper chamber 6, the pressure in upper chamber 6 becomes lower than the pressure in the upper chamber side connection passage 37. Since the pressure in the upper chamber side connection passage 37 is originally set at an initial trapped pressure (that is a low pressure equal to the atmospheric pressure or to the atmospheric pressure+alpha), the pressure in upper chamber 6 becomes a negative pressure readily. Consequently, in the case of a liquid operating fluid such as oil, there is formed, in the liquid, cavitation including bubbles and collapse of bubbles in the upper chamber 6, resulting in abnormal noises and decrease in the life of constituent parts By contrast to this, the upper chamber side damping valve 12 according to this embodiment is constructed to produce null or very small damping force to the inflow of the operating fluid into upper chamber 6. Therefore, the shock absorber S/A can prevent or restrain the occurrence of cavitation in upper chamber 6 on the extension stroke. On the other hand, the shock absorber S/A can produce an adequate damping force to the outflow of the operating liquid out of lower chamber 7 with the lower chamber side damping valve 23, and thereby works properly as the shock absorber.

When the operating fluid flows out of lower chamber 7, there is generated no cavitation or only cavitation of permissible magnitude because the pressure on the outer side of lower chamber side damping valve 23 is at a low level of an initial trapped pressure (that is a low pressure equal to the atmospheric pressure or to the atmospheric pressure+alpha), and at the same time a pressure variation is small as compared to the pressure variation in the case of upper chamber 6.

Moreover, the first tube member 13 defining the upper side connection passage 37 is connected to the upper (second) end of first cylinder 1 which is located on the upper (second) side of piston 4 opposite to the lower (first) side to which piston rod 5 extends. Therefore, it is possible to increase the inside diameter of first tube member 13, and thereby reduce the flow resistance of the upper chamber side connection passage 37. By contrast, in a comparative example employing a hollow piston rod including an inside bore serving as the connection passage 37, the diameter of the connection passage 37 is limited by the diameter of piston rod 5, so that the flow resistance is increased.

Therefore, the shock absorber S/A according to the first embodiment can decrease the pressure difference between the upper chamber 6 and the upper chamber side connection passage 37 when the operating fluid is drawn into upper chamber 6 by the downward movement of piston 4 on the extension stroke, as shown in FIG. 3. As a result, the shock absorber S/A can prevent unnatural noises and improve the durability by preventing the pressure in upper chamber 6 from decreasing to the negative pressure side, and thereby preventing undesired cavitation.

Figure 4:
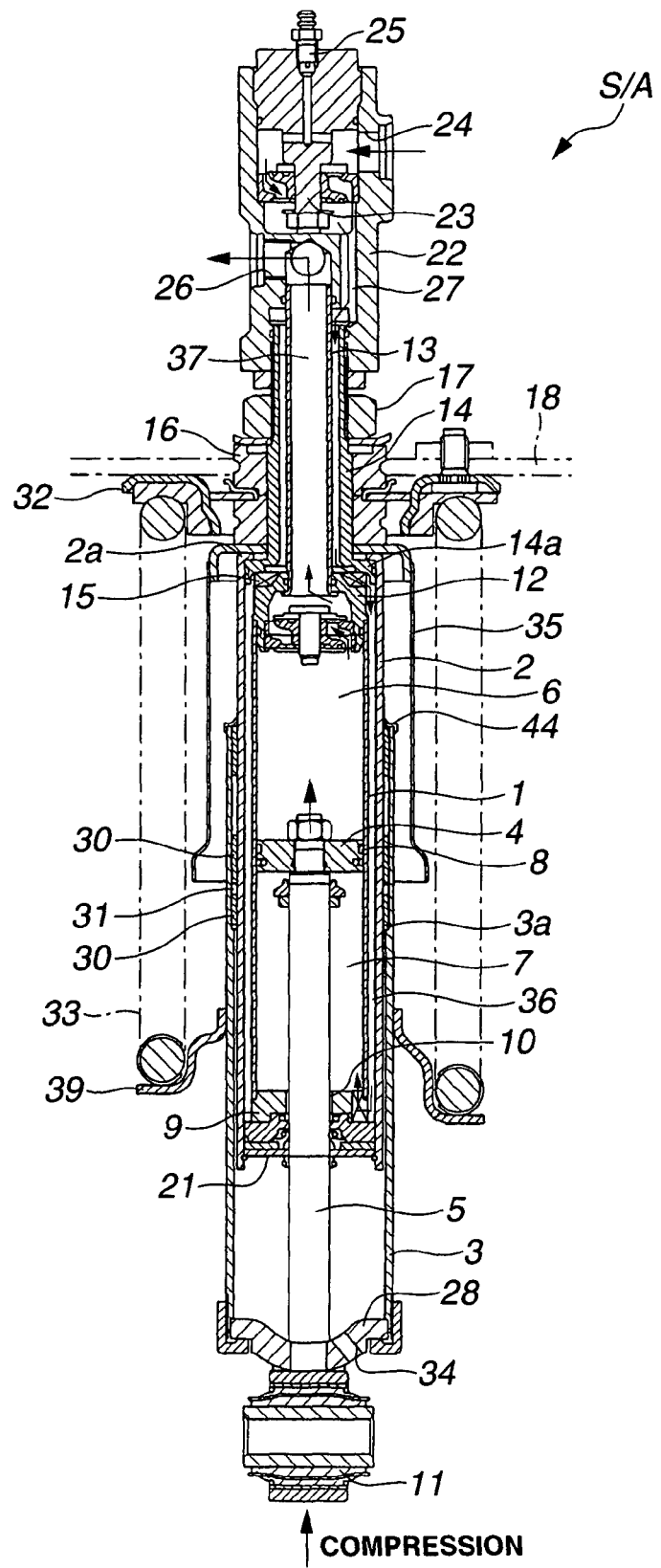
FIG. 4 is a sectional view for illustrating a compression stroke of the shock absorber of FIG. 1.

On the compression stroke, the piston 4 is pushed upwards, as shown in FIG. 4, and the pressure is increased in upper chamber 6. Therefore, by the difference between the pressure in the upper chamber 6 and the pressure in the upper chamber side connection passage 37, part of the operating fluid in upper chamber 6 flows, through upper chamber side damping valve 12, to the upper chamber side connection passage 37 of first tube member 13, and a damping force is generated during this flow. In this case, the operating fluid is drawn into lower chamber side connection passage 36 and lower chamber 7 through lower chamber side damping valve 23 by the upward movement of piston 4. However, the lower chamber side damping valve 23 is constructed to generate little or no damping force to the inflow into lower chamber side connection passage 36 and lower chamber 7. As a result, there is produced little or no pressure difference between the outside and the lower chamber side connection passage 36 and lower chamber 7.

With lower chamber side damping valve 23 arranged to produce null or very small damping force to the inflow of the operating fluid into upper chamber 6, the shock absorber S/A can prevent or restrain the occurrence of cavitation in lower chamber 7 and lower chamber side connection passage 36 on the compression stroke. On the other hand, the shock absorber S/A can produce an adequate damping force to the outflow of the operating liquid out of upper chamber 6 with the upper chamber side damping valve 12, and thereby works properly as the shock absorber.

When the operating fluid flows out of upper chamber 6, there is generated no cavitation or only cavitation of permissible magnitude because the pressure in upper side connection passage 37 on the outer side of upper chamber side damping valve 12 is at a low level of an initial trapped pressure (that is a low pressure equal to the atmospheric pressure or to the atmospheric pressure+alpha), and at the same time a pressure variation is small.

Moreover, the lower chamber side connection passage 36 is formed by the annular space between first and second cylinders 1 and 2 and the annular space between first and second tube members 13 and 14. Therefore, it is possible to increase the sectional size of lower chamber side connection passage 36, and thereby reduce the flow resistance of lower chamber side connection passage 36, as compared to a connection passage formed in the piston rod 5.

Therefore, the shock absorber S/A according to the first embodiment can decrease the pressure difference of the lower chamber 7 and the lower chamber side connection passage 36 from the outside when the operating fluid is drawn into lower chamber 7 by the upward movement of piston 4 on the compression stroke, as shown in FIG. 4. As a result, the shock absorber S/A can prevent unnatural noises and improve the durability by preventing the pressure in lower chamber 7 from decreasing to the negative pressure side, and thereby preventing undesired cavitation.

Furthermore, the reduction of the flow resistance in the upper chamber side connection passage 37 and lower chamber side connection passage 36 due to the increased cross sectional sizes of the passages leads to the reduction of friction in the stroke of piston 4. Accordingly, the shock absorber S/A according to the first embodiment can prevent deterioration of the damping force characteristic especially when the stroke speed of piston 4 is high.

In the shock absorber according to the first embodiment, it is possible to set the positions of the connecting portions or connection ports (24, 26) for connecting the lower and upper chambers 7 and 6 to the outside, on the upper (second) side of the upper (second) chamber 6, without increasing the outside diameter of the shock absorber so much. Specifically when the pipes 40 and 41 shown in FIG. 5 are connected with the connection ports of the shock absorber S/A, the positions of the connection ports on the upper (second) side of the fixing portion to fix the shock absorber to the vehicle body are advantageous for separating the connecting portions sufficiently from the region of interference with other components such as suspension parts swinging with suspension stroke, and for increasing the flexibility of layout of the structure connecting the pipes 40 and 41 with the ports of shock absorber S/A. The directions of the connection ports (24, 26) of shock absorber S/A can be determined in accordance with the surrounding layout (such as a space for bends of pipes 40 and 41).

The upper (second) end of second cylinder 2 is bent inwards to form the narrowed portion 2a in the form of an inward flange, and the narrowed portion 2a of second cylinder 2 is supported on the upper (second) end of first cylinder 1 located on the lower side of the narrowed portion 2a, and fixed by being pressed to the upper end of first cylinder 2 by the nut 17 through bush member 16. This structure can eliminate the need for a part for centering the first and second cylinders 1 and 2 (alignment), and for positioning the cylinders 1 and 2 in the axial direction, and thereby reduce the size of the shock absorber S/A.

In this embodiment, the upper chamber side damping valve 12 is incorporated, as the pug member closing the upper open end of first cylinder 1, into the first cylinder 1, so that the structure can be simplified and the mass of shock absorber S/A can be reduced, as compared to a structure having a separate valve unit at the upper end of upper chamber side connection passage 37.

In the suspension stroke in which the subassembly of piston 4 and piston rod 5 moves axially relative to the subassembly of first and second cylinders 1 and 2, the third cylinder 3 of shock absorber S/A according to this embodiment moves axially relative to the second cylinder 2, and the coil spring 33 absorbs vibrations by extension and compression.

When a bending moment M is applied to the shock absorber S/A, the second and third cylinders 2 and 3 are moved relative to each other so as to form an angle therebetween, and the clearance between the end of third cylinder 3 and the second cylinder 2 tends to be reduced so as to increase the possibility of interference therebetween specifically in the case of a small initial clearance. Third sliding bush 30 provided between second and third cylinders 2 and 3 can serve as a spacer for avoiding such interference between second and third cylinders 2 and 3, and thereby eliminate the need for increasing the outside diameter of third cylinder 3 and thereby increasing the initial clearance between second and third cylinders 2 and 3.

If the third sliding bush 30 is omitted, the bending force due to bending moment M is borne by the first sliding bush 8 between piston 4 and first cylinder 1, and the second sliding bush 10 between piston rod 5 and first bottom plug member 9. In the first embodiment, by contrast, the third sliding bush 30 between second and third cylinders 2 and 3 can bear part of the bending force, and accordingly reduce the contact pressure of each of the second and third sliding bushes 8 and 10. Thus, the shock absorber S/A can improve the reliability of each of sliding bushes 8 and 10, and reduce the sliding friction at the time of piston stroke in the state of bending moment M being applied.

The lubricant collecting portion 31 formed in third sliding bush 30 for storing grease as lubricant is effective for reducing friction, preventing seizure, and improving abrasion by applying the grease to the contact surface of the sliding bush with the movement of third cylinder 3. Moreover, the lubricant collecting portion 31 enclosing grease can provide adequate lubrication for a long time.

The seal member 44 disposed between the upper end of third cylinder 3 and the second cylinder 2 is effective for preventing foreign objects from entering the annular space between second and third cylinders 2 and 3 and from accumulating at the bottom of third cylinder 3. The step portion 3a formed in the inside circumferential surface of third cylinder 3 facilitates and ensures an operation of positioning the third sliding bush 30. Moreover, step portion 3a acts to prevent downward extraction of third sliding bush 30.

The air bleeding through hole 34 formed in third bottom plug member 28 is effective for enabling the ingress and egress of air in and out of the inside bore of third cylinder in the up and down movement of piston 4, and allowing foreign object such as water to be discharged out of the inside bore of third cylinder 3 through this through hole 34.

The shock absorbing system shown in FIG. 5 can provide the following effects.

Figure 6:
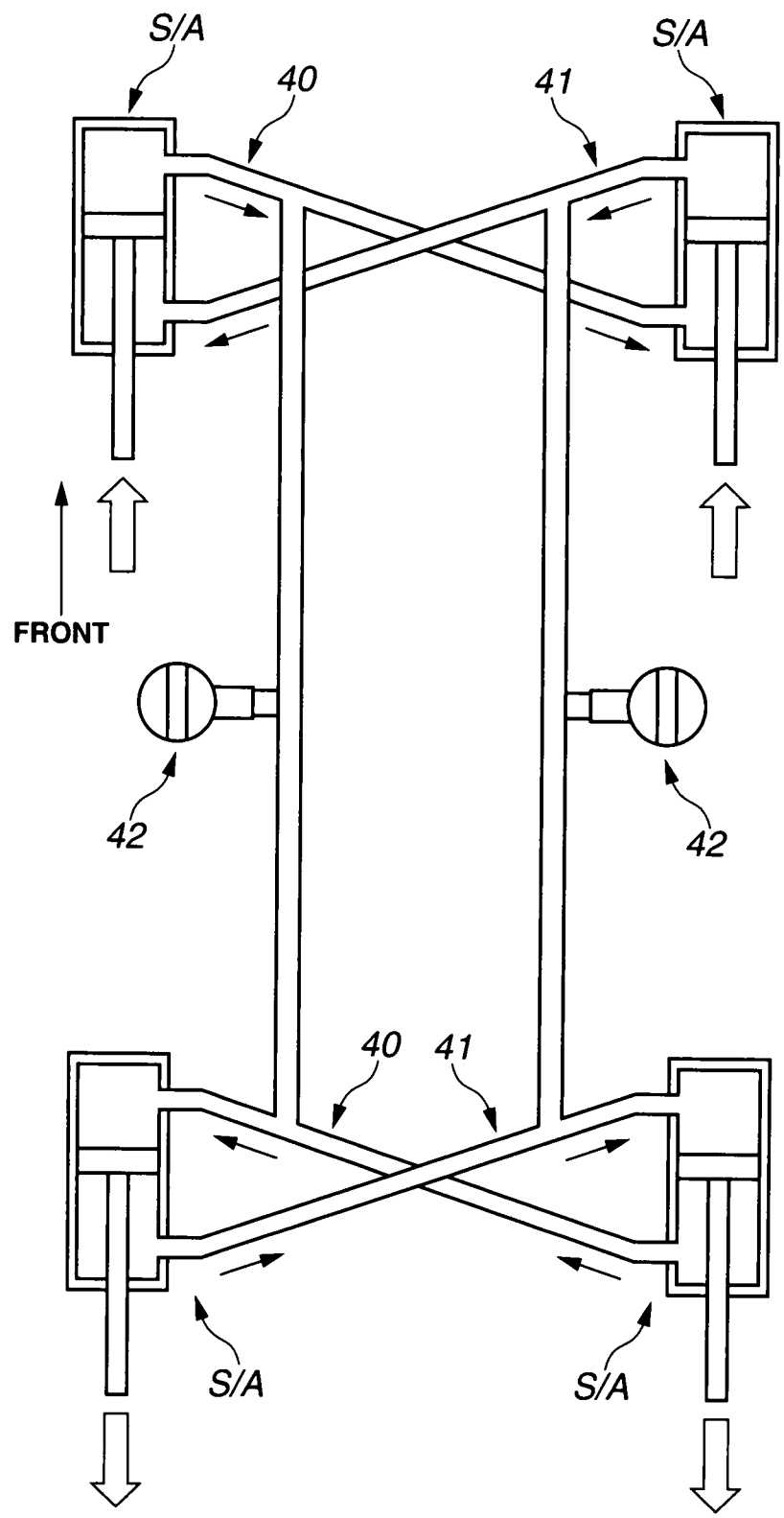
FIG. 6 is a schematic view showing the arrangement of the four shock absorbers in the state of pitch.

The four shock absorbers S/A receive forces as shown in FIG. 5 in the case of bounce of the vehicle, and as shown in FIG. 6 in the case of pitch of the vehicle. When the left and right shock absorbers S/A work in phase on each of the front and rear side, the operating fluid flows only between the left and right shock absorbers without flowing in and out of the accumulators 42, so that no reaction force is produced in the chambers on the inflow side to which the operating fluid flows.

Figure 7:
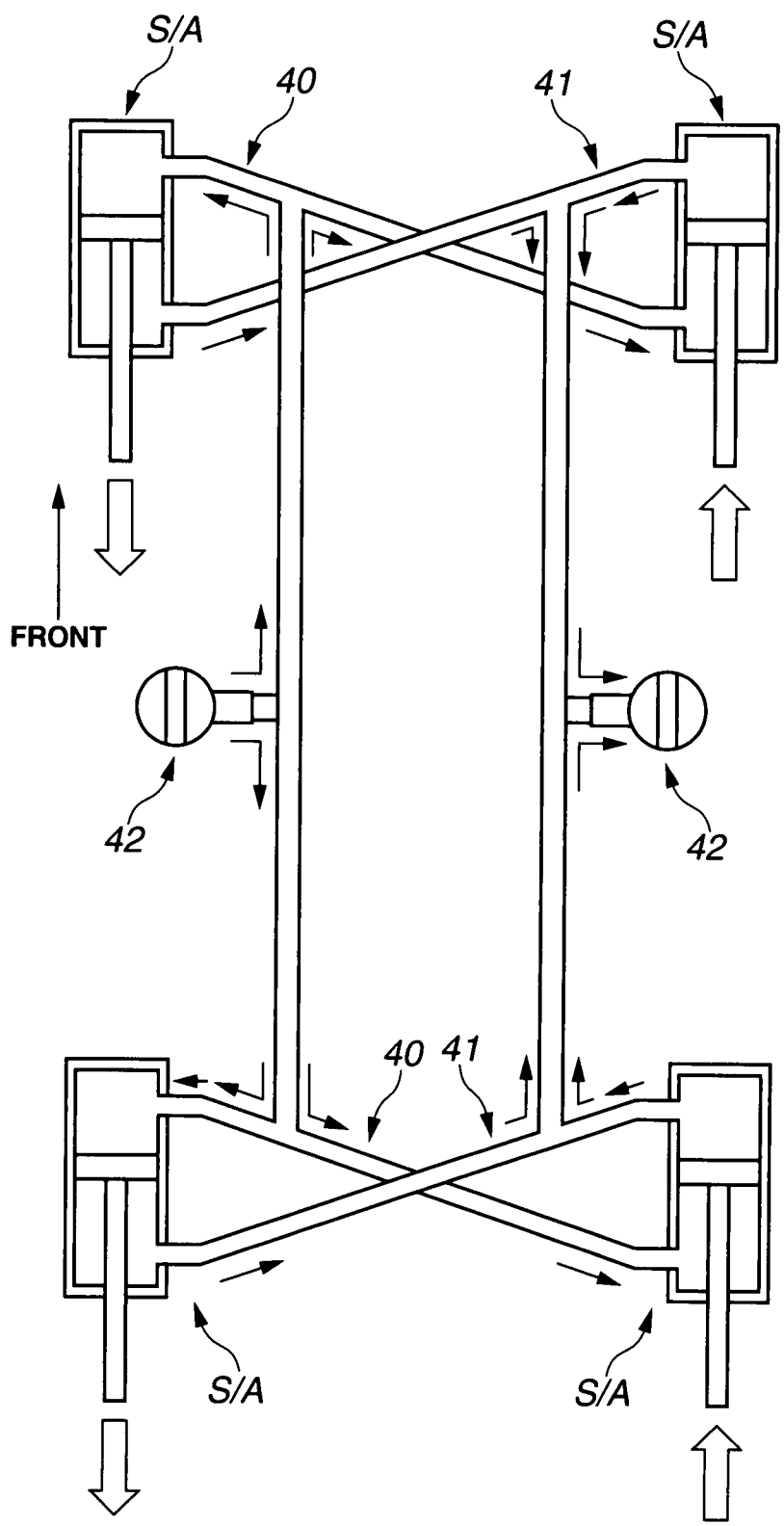
FIG. 7 is a schematic view showing the arrangement of the four shock absorbers in the state of roll.
Figure 8:
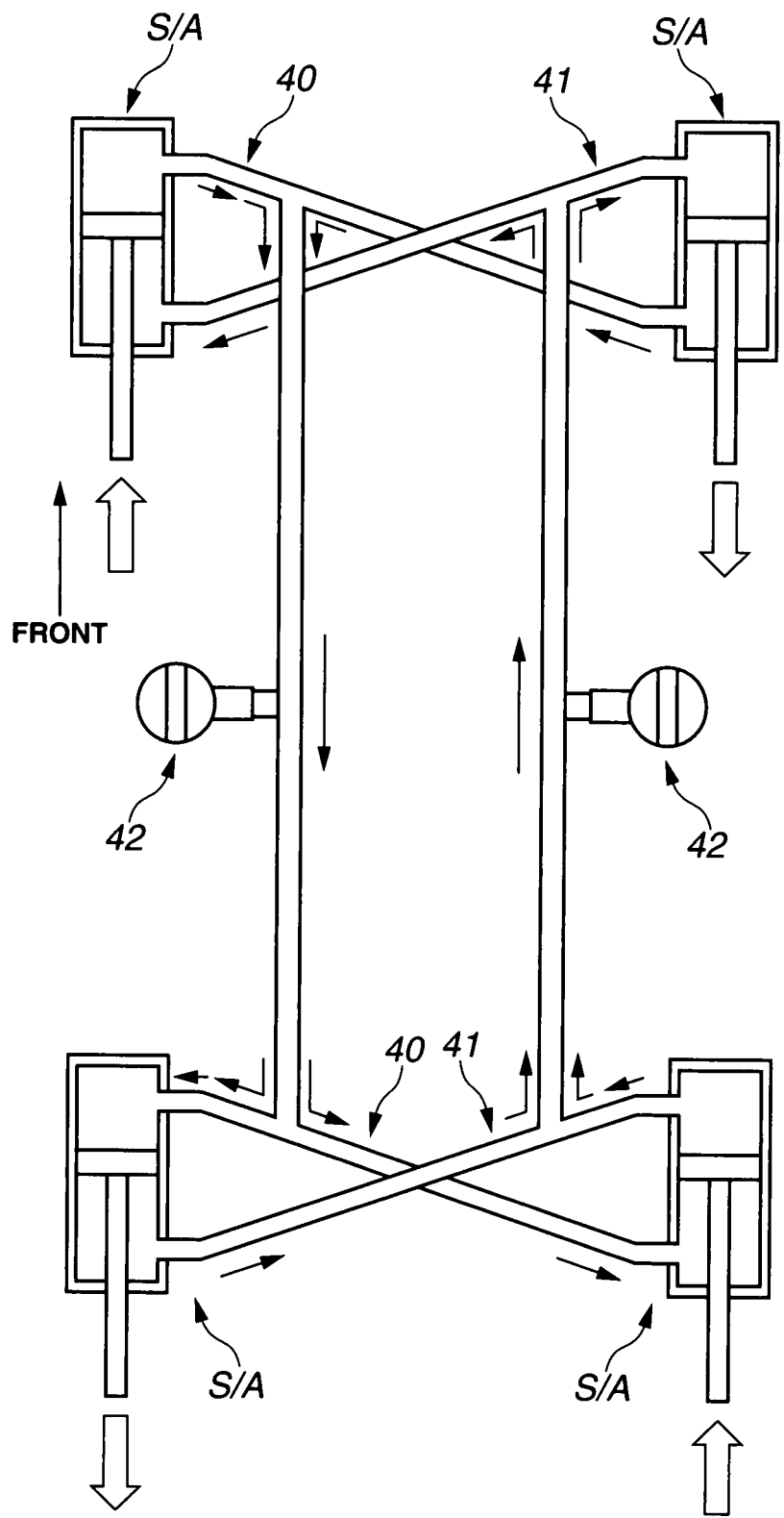
FIG. 8 is a schematic view showing the arrangement of the four shock absorbers in the state of operation on a mogul road.

In the case of roll (inclining behavior in the lateral direction, about the longitudinal axis of the vehicle), the operating fluid is force out from all the shock absorbers, as shown in FIG. 7. Therefore, the fluid flows into one of the accumulators 42, having no way out. Accordingly, the pressures in the chambers from which the fluid flows out become higher, and all the four shock absorbers S/A increase the force against the stroke of the piston and thereby restrain the rolling motion of the vehicle.

When the front wheels and rear wheels roll in the opposite direction in a driving operation on a mogul, the fluid pushed out of the rear side is drawn into the front side without flowing into the accumulators 42. Moreover, the fluid pressed out of the front side flows to the rear side, so that there is produced no reaction force.

In the preferable example shown in FIG. 1, the piston rod 5 extends downwards from piston 4. However, it is possible to arrange the shock absorber S/A according this embodiment so that the piston rod 5 extends upwards. In this case, the first side is the upper side, the second side is the lower side, the second chamber 6 is the lower chamber, and the first chamber 7 is the upper chamber.

First tube member 13 includes a lower (first) end portion having the inside cross sectional area which becomes gradually greater toward the lower (first) end of first tube member 13. This lower end portion of first tube member 13 can serve as an enlarged portion or flared portion. In this example, the lower end portion of first tube member 13 is shaped like a flared bell. Thus, the lower (first) end portion of second connection passage 37 defined by first tube member 13 is flared. This flared end portion of second connection passage 37 can act to prevent turbulent flow in the connecting portion between second connection passage 37 and upper chamber 6, and thereby reduce the flow resistance.

Upper chamber side damping valve 12 of this example includes two damping passages 52 and 53 connecting upper chamber 6 and the inside bore of first tube member 13. The cross sectional area of second connection passage 37 formed in first tube member 13 is greater than the cross sectional area of each of the damping passages 52 and 53. Therefore, the first tube member 13 having the larger inside bore serving as second connection passage 37 can regulate and straighten the fluid flow in second connection passage 37, and introduce the regulated flow into damping passages 52 and 53 thereby to enable the upper chamber side damping valve 12 to perform properly to achieve the damping function stably.

First tube member 13 is relatively long, and the axial length of second connection passage 37 is longer than the axial length of each of damping passages 52 and 53. The relatively long first tube member 13 can regulate and straighten the fluid flow in second connection passage 37 securely, and help the upper chamber side damping valve 12 perform the damping function stably.

Figure 9:
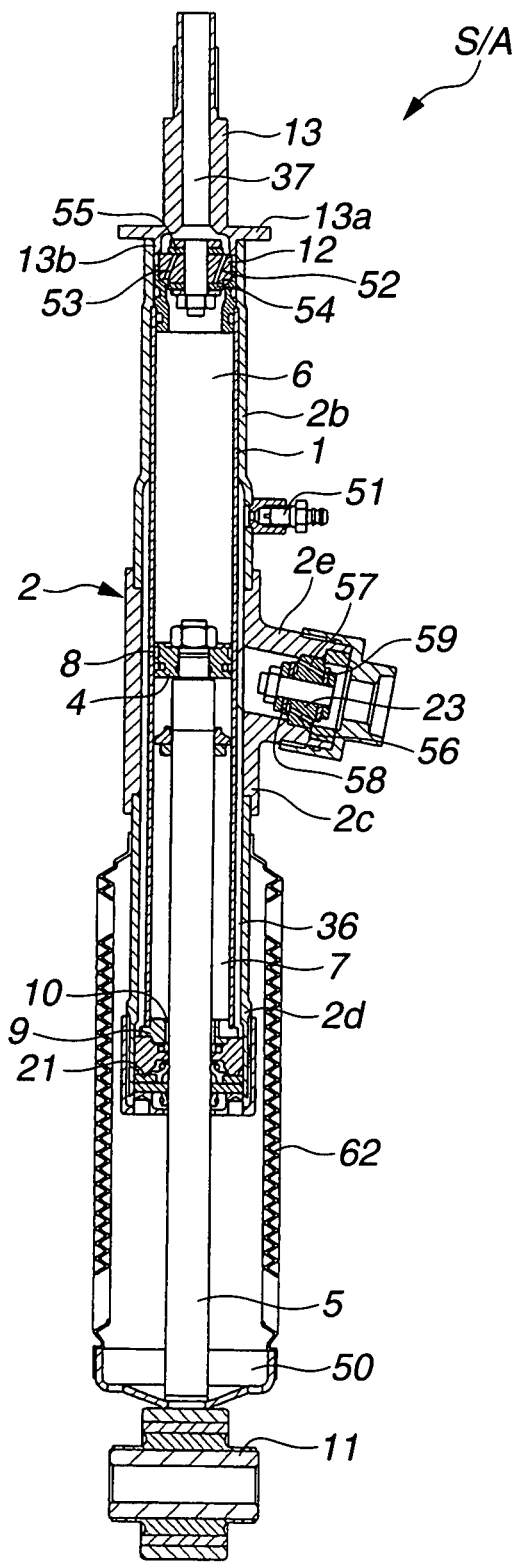
FIG. 9 is a sectional view of a shock absorber according to a second embodiment of the present invention.
Figure 10:
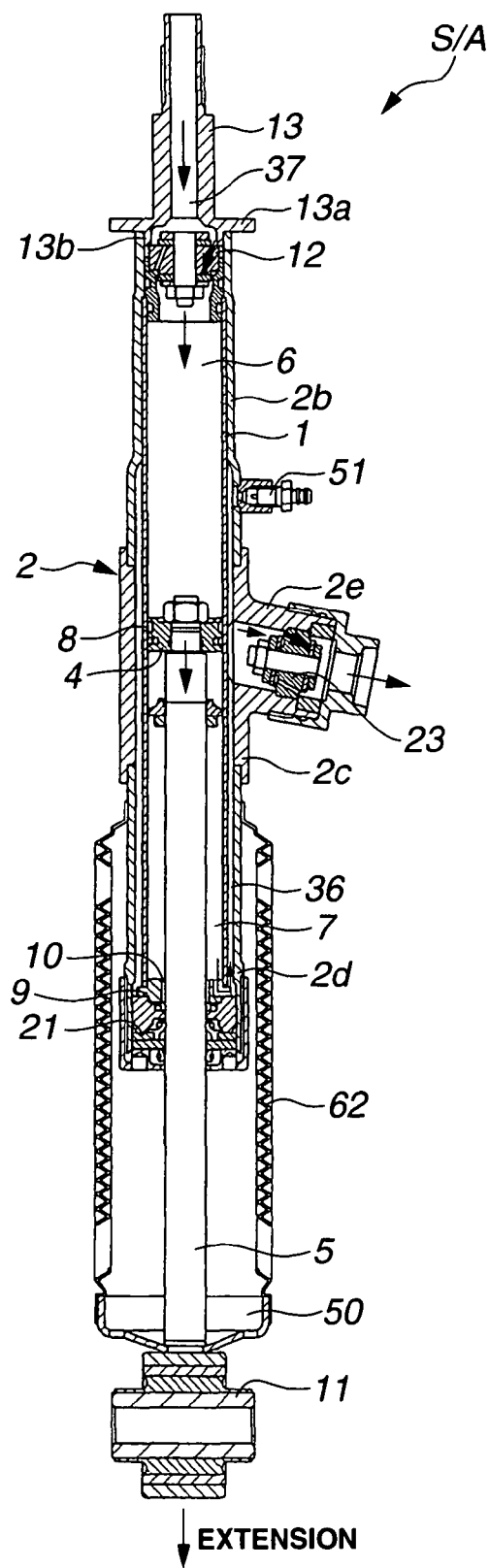
FIG. 10 is a sectional view for illustrating the extension stroke of the shock absorber of FIG. 9.
Figure 11:
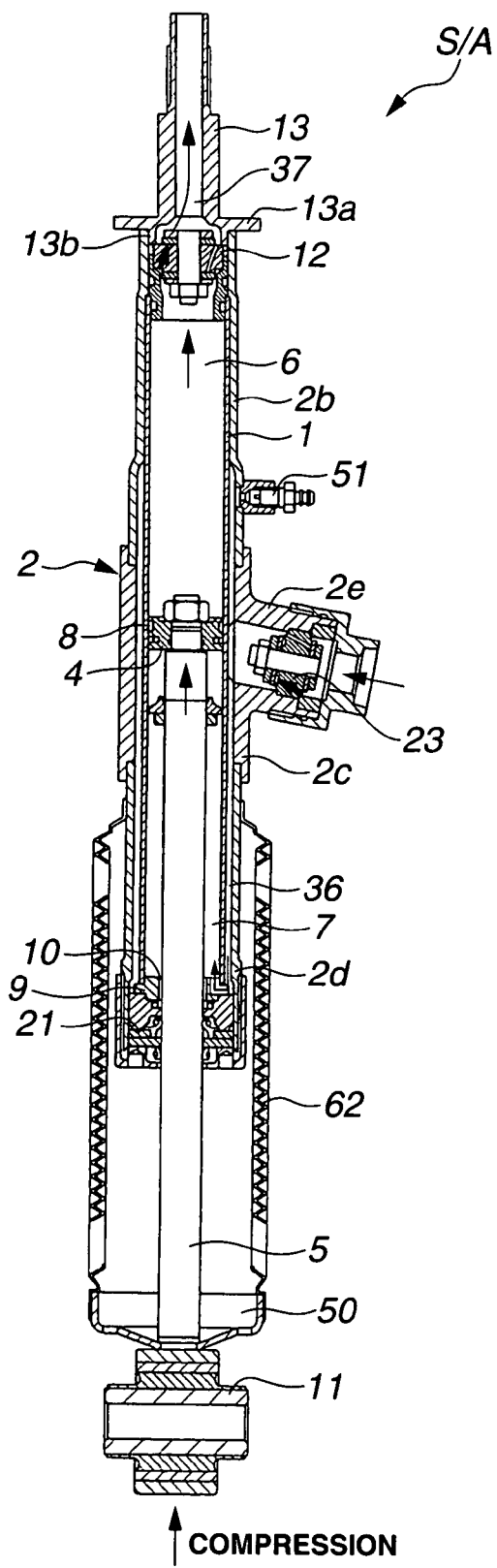
FIG. 11 is a sectional view for illustrating the compression stroke of the shock absorber of FIG. 9.

FIGS. 9~11 show a shock absorber S/A according to a second embodiment of the present invention. The shock absorber of FIG. 9 includes a plurality of parts substantially identical to the corresponding parts in the shock absorber of FIG. 1. These parts are given the same reference numerals.

FIG. 9 shows, in section, the shock absorber S/A of the second embodiment which is separate from the suspension spring. The shock absorber S/A of FIG. 9 has a coaxial double nesting structure of first (inner) cylinder 1, and second (outer) cylinder 2 surrounding first cylinder 1 coaxially.

Piston 4 is received slidably in first cylinder 1, and arranged to divide the inside cylinder bore of first cylinder 1 into first and second chambers. In this example, the first chamber is lower chamber 7 formed axially between piston 4 and the lower (first) end of first cylinder 1, and the second chamber is upper chamber 6 formed axially between piston 4 and the upper (second) end of first cylinder 1. Piston 4 is provided with first sliding bush 8 for reducing a sliding friction of piston 4.

Piston rod 5 extends from the upper (second) end connected with piston 4, to the lower (first) end in the downward (second) direction. Piston rod 5 extends through the first bottom plug member 9 closing the lower (first) end of first cylinder 1, and projects from first cylinder 1 in the downward (second) direction. First bottom plug member 9 is formed with a center through hole through which piston rod 5 extends slidably, and one or more connecting through holes for connecting the lower (first) chamber 7 to the outside. In the center hole of first bottom plug member 9, there is provided second sliding bush 10 in sliding contact with piston rod 4. Bush member 11 is fixed to the lower (first) end of piston rod 4 for connection with the a suspension and/or axle.

A (single) tube member 13 is fixed to the upper (second) end of first cylinder 1 through upper (second) chamber side damping device or second (or second side) damping device 12. The tube member 13 of FIG. 9 corresponds to the first tube member 13 of FIG. 1. Second damping device 12 is fixed in the upper (second) end of first cylinder 1 so as to serve as an end or plug member closing the upper (second) open end of first cylinder 1. Second damping valve 12 includes a lower (first) port opening to upper (second) chamber 6 of first cylinder 1, and an upper (second) port opening to the inside cavity of tube member 13. Tube member 13 extends upwards from the upper end of first cylinder 1 coaxially with first cylinder 1.

An outward flange 13a is formed in a lower (first) end portion of tube member 13. The inside diameter of an upper end portion of second cylinder 2 is set equal to, or slightly smaller by an interference than, the outside diameter of first cylinder 1. Accordingly, the upper portion of first cylinder 1 is press fit in the upper end portion of second cylinder 2 by inserting first cylinder 1 into second cylinder 2. This fitting structure facilitates the centering and positioning of first and second cylinders 1 and 2.

Upper chamber side damping valve 12 includes a portion which is fit in second cylinder 2, and which contacts with the inside circumferential surface of second cylinder 2, thereby serving as a plug member closing the upper end of second cylinder 2. The lower surface of outward flange 13a formed in the lower end portion of tube member 13 abuts on the upper end of second cylinder 2. Tube member 13 further includes a tubular projection 13b which projects downwards from the lower surface of outward flange 13a into second cylinder 2, and which is fit in second cylinder 2.

Between the outside circumferential surface of first cylinder 1 and the inside circumferential surface of second cylinder 2, there is provided a spacer member composes of a plurality of spacers arranged circumferentially at regular intervals for securing the annular space between first and second cylinders 1 and 2, and at the same time for defining an axial passage composed of gaps among the spacers to enable the axial fluid between the upper side and the lower side. Thus, lower chamber side connection passage 36 is formed by the annular space between first and second cylinders 1 and 2. The spacers need not be long to cover the axial length over which the outside circumferential surface of first cylinder 1 and the inside circumferential surface of second cylinder 2 confront radially each other. The lower chamber side connection passage 36 of FIG. 9 is formed only by the annular space between first and second cylinders 1 and 2, and does not extend upwards beyond first and second cylinders 1 and 2. The annular space between first and second cylinders 1 and 2 extends upwards to an upper end which is closed by the first cylinder 1 fit in second cylinder 2, and which is located on the lower side of the upper end of first cylinder 1 and on the lower side of the upper end of second cylinder 2.

The lower (first) end of second cylinder 2 is closed by second bottom plug member 21 disposed under the first bottom plug member 9 of first cylinder 1 so that the upper side of second bottom plug member 21 abuts on the lower side of first bottom plug member 9. The lower end of first connection passage 36 formed by the annular space between first and second cylinders 1 and 2 is connected with the lower (first) chamber 7 through at least one connecting through hole formed in first bottom plug member 9.

Second cylinder 2 of FIG. 9 is a subassembly composed of three hollow cylindrical members 2b, 2c and 2d arranged along the center axis. Cylindrical member 2b is an upper cylindrical member in which first cylinder 1 is press fit. Cylindrical member 2d is a lower cylindrical member. Second bottom plug member 21 is fixed to the lower end of this lower cylindrical member 2d. Cylindrical member 2c is an intermediate cylindrical member located axially between upper cylindrical member 2b and lower cylindrical member 2d. The upper end of intermediate cylindrical member 2c is connected with the lower end of upper cylindrical member 2b, and the lower end of intermediate cylindrical member 2c is connected with the upper end of lower cylindrical member 2d. Intermediate cylindrical member 2c includes a tubular projection 2e projecting radially outwards like a faucet or tap, and including an inside bore extending from an inner end opening in the inside circumferential surface of intermediate cylindrical member 2c of second cylinder 2, to an outer end opening to the outside and serving as a connection port. Lower chamber side damping device 23 is disposed in the tubular projection 2e of intermediate cylindrical member 2c of second cylinder 2.

A circular disk member 50 is fixed coaxially to the lower end of piston rod 5. A bellows member 62 surrounds the lower cylindrical member 2d of second cylinder 2 and piston rod 5, to protect piston rod 5 against foreign objects. The lower end of bellows member 62 is attached to the circular disk member 50, and the upper end of bellows member 62 is attached to lower cylindrical member 2d. A device 51 is a valve for air bleeding.

Each of upper chamber side (second) damping valve 12 and lower chamber side (first) damping valve 23 is set to have such a damping characteristic that an inflow damping force to the inflow of an operating fluid into the corresponding one of the upper and lower chambers 6 and 7 in first cylinder 1 is null or small, and an outflow damping force of a relatively greater magnitude required by the shock absorber S/A is generated to the outflow of the operating fluid out of the corresponding one of upper and lower chambers 6 and 7, as in the first embodiment.

The thus-constructed shock absorber S/A shown in FIG. 9 can be installed in a vehicle for one of the wheels as in the first embodiment, and connected with other shock absorbers S/A for the other wheels of the vehicle in the same manner as in the first embodiment.

The thus-constructed shock absorber S/A of FIG. 9 is operated on the extension stroke and compression stroke in the following manner.

On the extension stroke, the piston 4 is pushed downwards, as shown in FIG. 10, and the pressure is increased in lower chamber 7 and lower chamber side connection passage 36. Therefore, by the difference between the pressure in the lower chamber 7 and lower chamber side connection passage 36, and the pressure of the outside, part of the operating fluid in lower chamber 7 and lower chamber side connection passage 36 flows, through lower chamber side damping valve 23, to the outside, and lower chamber side damping valve 23 produces an adequate damping force during this flow. In this case, the operating fluid is drawn into upper chamber 6 by the downward movement of piston 4 through upper chamber side damping valve 12. However, the upper chamber side damping valve 12 is constructed to generate little or no damping force to the inflow into upper chamber 6. As a result, there is produced little or no pressure difference between the upper chamber side connection passage 37 and upper chamber 6.

The tube member 13 defining the upper side connection passage 37 is connected to the upper (second) end of first cylinder 1 on the upper (second) side of piston 4 opposite to the lower side to which piston rod 5 extends. Therefore, it is possible to increase the inside diameter of tube member 13, and thereby reduce the flow resistance of the upper chamber side connection passage 37.

Therefore, the shock absorber S/A according to the second embodiment can decrease the pressure difference between the upper chamber 6 and the upper chamber side connection passage 37 when the operating fluid is drawn into upper chamber 6 by the downward movement of piston 4 on the extension stroke, as shown in FIG. 10. As a result, the shock absorber S/A can prevent unnatural noises and improve the durability by preventing the pressure in upper chamber 6 from decreasing to the negative pressure side, and thereby preventing undesired cavitation.

On the compression stroke, the piston 4 is pushed upwards, as shown in FIG. 11, and the pressure is increased in upper chamber 6. Therefore, by the difference between the pressure in the upper chamber 6 and the pressure in the upper chamber side connection passage 37, part of the operating fluid in upper chamber 6 flows, through upper chamber side damping valve 12, to the upper chamber side connection passage 37 of tube member 13, and upper chamber side damping valve 12 produces a damping force during this flow. In this case, the operating fluid is drawn through lower chamber side damping valve 23 into lower chamber side connection passage 36 and lower chamber 7 by the upward movement of piston 4. However, the lower chamber side damping valve 23 is constructed to generate little or no damping force to the inflow into lower chamber side connection passage 36 and lower chamber 7. As a result, there is produced little or no pressure difference between the outside and the lower chamber side connection passage 36 and lower chamber 7.

The lower chamber side connection passage 36 is formed by the annular space between first and second cylinders 1 and 2. Therefore, it is possible to increase the sectional size of lower chamber side connection passage 36, and thereby reduce the flow resistance of lower chamber side connection passage 36, as compared to a connection passage formed in the piston rod 5. Moreover, with the lower chamber side damping valve 23 disposed at the intermediate cylindrical member 2c of second cylinder 2, it is possible to decrease the length of lower chamber side connection passage 36.

The shock absorber S/A according to the second embodiment can decrease the pressure difference of the lower chamber 7 and the lower chamber side connection passage 36 from the outside when the operating fluid is drawn into lower chamber 7 by the upward movement of piston 4 on the compression stroke, as shown in FIG. 11. As a result, the shock absorber S/A can prevent unnatural noises and improve the durability by preventing the pressure in lower chamber 7 from decreasing to the negative pressure side, and thereby preventing undesired cavitation.

Furthermore, as mentioned before, the reduction of the flow resistance in the upper chamber side connection passage 37 and lower chamber side connection passage 36 due to the increased cross sectional sizes of the passages leads to the reduction of friction in the stroke of piston 4. Accordingly, the shock absorber S/A according to the second embodiment can prevent deterioration of the damping force characteristic especially when the stroke speed of piston 4 is high.

In the shock absorber according to the second embodiment, it is possible to set the position of the connecting portion or connection port for connecting the upper chamber 6 to the outside, on the upper (second) side of the upper (second) chamber 6 without increasing the outside diameter of the shock absorber S/A so much. Specifically when a pipe is connected with the connection port of the shock absorber S/A, the position of the connection port on the upper (second) side of the fixing portion to fix the shock absorber to the vehicle body is advantageous for separating the connecting portion sufficiently from the region of interference with other components such as suspension parts swinging with suspension stroke. The directions of the connection ports of shock absorber S/A can be determined in accordance with the surrounding layout (such as a space for bends of pipes 40 and 41). The connection port for lower chamber 7 and the connection port for upper chamber 6 are separated in the axial (vertical) direction, sufficiently from each other. Therefore, it is easy to avoid interference between the pipe connected with one of the connection ports, and the pipe connected with the other.

The upper portion of first cylinder 1 is forcibly fit in the upper portion of second cylinder 2. This structure can eliminate the need for one or more parts for the centering (alignment) and the positioning in the axial direction, of first and second cylinders 1 and 2.

The upper chamber side damping valve 12 is incorporated, as the pug member closing the upper open end of first cylinder 1, into the first cylinder 1, so that the structure can be simplified and the mass of shock absorber S/A can be reduced, as compared to a structure having a separate valve unit at the upper end of upper chamber side connection passage 37. In other respects including constructional features and effects, the second embodiment is substantially identical to the first embodiment.

Tube member 13 includes a lower (first) end portion having the inside cross sectional area which becomes gradually greater toward the lower (first) end of tube member 13. This lower end portion of tube member 13 can serve as an enlarged portion or flared portion. Thus, the lower (first) end portion of second connection passage 37 defined by tube member 13 is flared. This flared end portion of second connection passage 37 can act to prevent turbulent flow in the connecting portion between second connection passage 37 and upper chamber 6, and thereby reduce the flow resistance.

Upper chamber side damping valve 12 of this example includes two damping passages 52 and 53 connecting upper chamber 6 and the inside bore of first tube member 13. The cross sectional area of second connection passage 37 formed in first tube member 13 is greater than the cross sectional area of each of the damping passages 52 and 53. Therefore, the tube member 13 having the larger inside bore serving as second connection passage 37 can regulate and straighten the fluid flow in second connection passage 37, and introduce the regulated flow into damping passages 52 and 53 thereby to enable the upper chamber side damping valve 12 to perform properly to achieve the damping function stably.

Tube member 13 is relatively long, and the axial length of second connection passage 37 is longer than the axial length of each of damping passages 52 and 53. The relatively long tube member 13 can regulate and straighten the fluid flow in second connection passage 37 securely, and help the upper chamber side damping valve 12 perform the damping function stably.

According to the present invention, shock absorbing apparatus may be a shock absorber, or may be a shock absorbing system including at least one shock absorber. In either case, the shock absorber may comprise: a piston which is received in a cylinder bore and which divide the cylinder bore into first and second chambers; a piston rod being connected with the piston and extending in the first chamber; a first (inner) cylinder defining the inside bore in which the piston is slidably received; a second (outer) cylinder surrounding the first cylinder and defining a first connection passage connected with the first chamber; a tube member defining a second connection passage connected with the second chamber; and a damping device to dampen the flow of an operating fluid at least in one of an outflow direction out of the second chamber and an inflow direction into the second chamber through the second connection passage. According to the illustrated embodiments, the shock absorber may further comprise any one or more of the following features. (1) The damping device such as second chamber side damping device 12 may have a damping characteristic making a damping force to the inflow of the operation fluid into the second chamber, lower or smaller than a damping force to the outflow of the operating fluid from the second chamber. (2) The shock absorber may further comprise another damping device, such as first chamber side damping device 23, having a damping characteristic making a damping force to the inflow of the operation fluid into the first chamber, lower or smaller than a damping force to the outflow of the operating fluid from the first chamber. (3) The first cylinder extends from a first end so located that the first chamber is formed between the first end and the piston, to a second end so located that the second chamber is formed between the piston and the second end; and the second end of the first cylinder may be press fit and positioned in the second cylinder. (4) The second cylinder may include a narrowed portion (2a) formed at one end, such as the second (upper) end, of the second cylinder (2) and shaped like an inward flange. In this case, the first and second cylinders are connected by supporting the narrowed portion (2a) of the second cylinder on one end, such as the second (upper) end, of the first cylinder (through the outward flange 14a, spacer member (15) and second damping valve 12 in the example of FIG. 1). (5) The second chamber may be an upper chamber, and the shock absorber may further comprise a fixing portion (such as item 16 and/or 32) adapted to be fixed to a vehicle body (18), a first connecting portion or port (such as 24) connecting the first connection passage to the outside, and a second connecting portion or port (such as 26) connecting the second connection passage to the outside. At least one of the first and second connecting portions may be located above the fixing portion or on the second (upper) side of the fixing portion. (6) In both of the first and second embodiments, the second connection portion for the second chamber is located on the second (upper) side of the fixing portion, on the second (upper) side of the upper chamber, and/or on the second (upper) side of the second chamber side damping valve (12). (7) The shock absorber may further comprise a first end member (such as items 9 and/or 21) closing the first (lower) ends of the first and second cylinders (1, 2) and including a passage connecting the first (lower) chamber (7) with a first (lower) end of the first connection passage (36) formed between the first and second cylinders. (8) The shock absorber may further comprise a second end member (such as item 15) defining a passage connecting a second (upper) end of the space between the first and second cylinders (1, 2) with the space between the first and second tube members (13, 14).

The shock absorber may further comprise a port member (such as member 22) enclosing the second (upper) ends of the first and second tube members and including a first connection port (such as 24) opening to the outside and leading to the space between the first and second tube members, and a second connection port (such as 26) opening to the outside and leading to the second connection passage formed in the first tube member.

The shock absorbing apparatus or system may comprise a first shock absorber pair including left and right shock absorbers each comprising the piston (4), the piston rod (5), the first (inner) cylinder (1), the second (outer) cylinder (2), the tube member (13), the damping device (12) and first and second ports; a first lateral pipe (40) connecting the first port of the right shock absorber with the second port of the left shock absorber; and the second lateral pipe (41) connecting the second port of the right shock absorber with the first port of the left shock absorber. In this case, the shock absorbing apparatus may further comprise: a second shock absorber pair including left and right shock absorbers each comprising the piston (4), the piston rod (5), the first (inner) cylinder (1), the second (outer) cylinder (2), the tube member (13), the damping device (12) and first and second ports; a third lateral pipe (40) connecting the first port of the right shock absorber with the second port of the left shock absorber of the second shock absorber pair; and a fourth lateral pipe (41) connecting the second port of the right shock absorber with the first port of the left shock absorber of the second shock absorber pair; a first longitudinal pipe connecting the first lateral pipe and the third lateral pipe; and a second longitudinal pipe connecting the second lateral pipe and the fourth lateral pipe.

The first shock absorber pair may be a front shock absorber pair (for front wheels of a vehicle) including the left and right front shock absorbers each of which may include a coil spring disposed around the second cylinder as in the example shown in FIG. 1. The second shock absorber pair may be a rear shock absorber pair (for rear wheels of the vehicle) including the left and right rear shock absorbers each of which may be constructed as show in FIG. 9.

This application is based on a prior Japanese Patent Application No. 2006-197171 filed on Jul. 19, 2006. The entire contents of this Japanese Patent Application No. 2006-197171 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:
1. A shock absorber comprising:
a first cylinder extending from a first end of the first cylinder to a second end of the first cylinder in a first direction, and including an inside bore;
a piston dividing the inside bore of the first cylinder into a first chamber between the piston and the first end of the first cylinder, and a second chamber between the piston and the second end of the first cylinder, wherein the first chamber and the second chamber are adjacent to the piston;
a piston rod which is connected to the piston and which extends within the first chamber;
a second cylinder surrounding the first cylinder;
a first connection passage, at least a portion of which is formed by a space between the first and second cylinders, the first connection passage being arranged to connect the first chamber to a location outside of the shock absorber in a fluid-conducting manner;
a first tube member extending from the second end of the first cylinder in a direction away from the second chamber, and defining a second connection passage connected with the second chamber at the second end of the first cylinder in a fluid-conducting manner;
a damping device comprising at least one valve element, the damping device being arranged to provide a damping force to an operating fluid flowing between the second chamber and the second connection passage, and the damping device being disposed between the second chamber and the second connection passage such that the second connection passage is connected with the second chamber through the damping device in a fluid-conducting manner; and
a connection port which is opened to the location outside of the shock absorber, which is connected with the first chamber through the first connection passage, and which is configured to be connected with another shock absorber,
wherein the shock absorber further comprises a second tube member surrounding the first tube member and defining a space between the first and second tube members,
wherein the second tube member is arranged such that the space between the first and second cylinders is con- nected to the outside in a fluid-conducting manner through the space between the first and second tube members, and wherein an additional portion of the first connection passage is formed by the space between the first and second tube members.

2. A shock absorber comprising:
a first cylinder extending from a first end of the first cylinder to a second end of the first cylinder in a first direction, and including an inside bore;
a piston dividing the inside bore of the first cylinder into a first chamber between the piston and the first end of the first cylinder, and a second chamber between the piston and the second end of the first cylinder, wherein the first chamber and the second chamber are adjacent to the piston;
a piston rod which is connected to the piston and which extends within the first chamber;
a second cylinder surrounding the first cylinder;
a first connection passage, at least a portion of which is formed by a space between the first and second cylinders, the first connection passage being arranged to connect the first chamber to a location outside of the shock absorber in a fluid-conducting manner;
a first tube member extending from the second end of the first cylinder in a direction away from the second chamber, and defining a second connection passage connected with the second chamber at the second end of the first cylinder in a fluid-conducting manner; and
a damping device comprising at least one valve element, the damping device being arranged to provide a damping force to an operating fluid flowing between the second chamber and the second connection passage, and the damping device being disposed between the second chamber and the second connection passage such that the second connection passage is connected with the second chamber through the damping device in a fluid-conducting manner;
wherein the piston is configured to separate the first and second chambers so that the first and second chambers are not in fluid communication with each other through the piston.

3. The shock absorber as claimed in claim 2, further comprising a second-side end member which closes the second end of the first cylinder.

4. The shock absorber as claimed in claim 2, wherein the damping device extends, in a second direction opposite to the first direction, from a second end of the damping device to a first end of the damping device, wherein the first end of the damping device is located axially between the second end of the first cylinder and the piston.

5. The shock absorber as claimed in claim 2, wherein the first tube member extends in the first direction from a first end of the first tube member to a second end of the first tube member, wherein the first end of the first tube member is connected with the second end of the first cylinder through the damping device such that the first tube member is aligned with the first cylinder and connected end to end with the first cylinder.

6. The shock absorber as claimed in claim 2, wherein the damping device comprises a damping passage connecting the second chamber with the second connection passage in a fluid-conducting manner, and the first tube member comprises an inside bore which serves as the second connection passage and which has a cross sectional area greater than the cross sectional area of the damping passage of the damping device.

7. The shock absorber as claimed in claim 6, wherein an axial length of the inside bore of the first tube member is greater than the axial length of the damping passage of the damping device.

8. The shock absorber as claimed in claim 2, wherein the first tube member comprises a flared portion, the flared portion comprising a flared inside circumferential surface which is shaped such that a cross sectional area of the flared inside circumferential surface becomes gradually greater toward the second chamber.

9. The shock absorber as claimed in claim 2, wherein, in addition to the damping device which is a second-side damping device for the second chamber, the shock absorber further comprises, a first-side damping device which is configured to provide a damping force to the operating fluid flowing between the first chamber and the first connection passage.

10. The shock absorber as claimed in claim 2, further comprising:
a third cylinder which surrounds the second cylinder, which is arranged to move axially relative to the second cylinder, and which is connected to the piston rod; and
a coil spring which is disposed around the third cylinder and which comprises a first spring end connected to the third cylinder, and a second spring end connected to at least one of the first and second cylinders.

11. The shock absorber as claimed in claim 2, wherein:
the first end of the first cylinder is a lower end,
the second end of the first cylinder is an upper end,
the first direction is an upward direction,
the first chamber is a lower chamber,
and
the first tube member extends in an upward direction.

12. The shock absorber as claimed in claim 2, further comprising a connection port which is opened to the location outside of the shock absorber, which is connected with the first chamber through the first connection passage, and which is configured to be connected with another shock absorber.

13. The shock absorber as claimed in claim 12, wherein, in addition to the connection port, which is a first connection port, the shock absorber further comprises a second connection port which is opened to a location outside of the shock absorber, the second connection port being connected with the second chamber through the second connection passage in a fluid-conducting manner.

14. The shock absorber as claimed in claim 13, wherein the first and second connection ports are configured to be connected with said another shock absorber.

15. The shock absorber as claimed in claim 12, wherein the connection port opens radially to the location outside of the shock absorber.

16. The shock absorber as claimed in claim 2, wherein the first tube member extends past the second end of the first cylinder.

17. A shock absorber comprising:
a first cylinder extending from a first end of the first cylinder to a second end of the first cylinder in a first direction, and including an inside bore;
a piston dividing the inside bore of the first cylinder into a first chamber between the piston and the first end of the first cylinder, and a second chamber between the piston and the second end of the first cylinder;
a piston rod which is connected to the piston and which extends within the first chamber;
a second cylinder surrounding the first cylinder;
a first connection passage, at least a portion of which is formed by a space between the first and second cylinders, the first connection passage being arranged to connect the first chamber to a location outside of the shock absorber in a fluid-conducting manner;

a first tube member extending from the second end of the first cylinder in a direction away from the second chamber, and defining a second connection passage connected with the second chamber at the second end of the first cylinder in a fluid-conducting manner; and a damping device, the damping device being arranged to provide a damping force to an operating fluid flowing between the second chamber and the second connection passage, and the damping device being disposed between the second chamber and the second connection passage such that the second connection passage is connected with the second chamber through the damping device in a fluid-conducting manner, wherein the shock absorber further comprises a second tube member surrounding the first tube member and defining a space between the first and second tube members, wherein the second tube member is arranged such that the space between the first and second cylinders is connected to the outside in a fluid-conducting manner through the space between the first and second tube members, and wherein an additional portion of the first connection passage is formed by the space between the first and second tube members.

18. The shock absorber as claimed in claim 17, wherein:

the first chamber and the second chamber are adjacent to the piston, and the damping device comprises at least one valve element.

* * * * *